United States Patent Office 3,744,995
Patented July 10, 1973

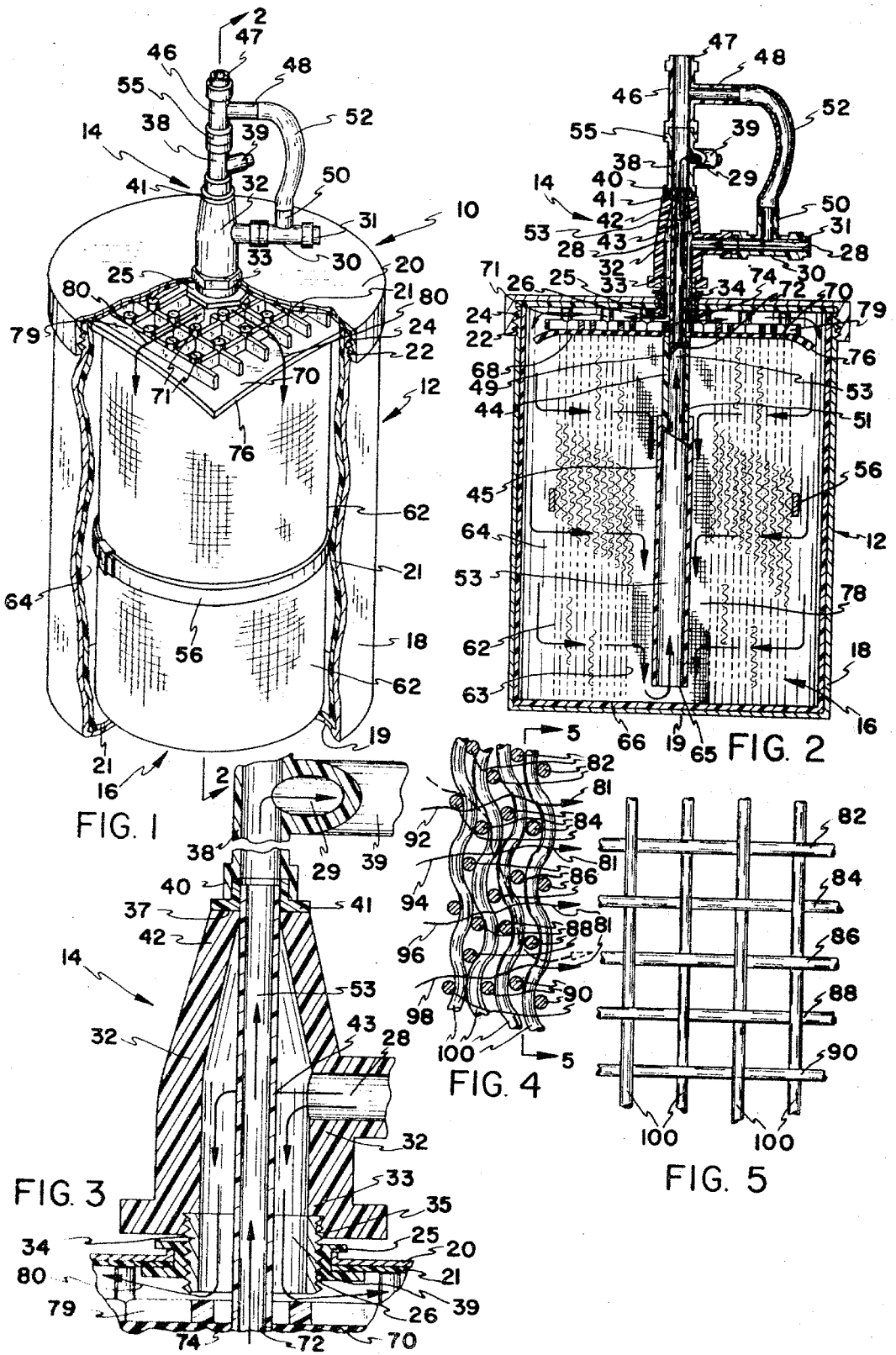

3,744,995
SILVER RECOVERY
Byron R. MacKay, 2952 Robidoux Road,
Sandy, Utah 84070
Original application Mar. 9, 1970, Ser. No. 17,836, now
Patent No. 3,630,505, dated Dec. 28, 1971. Divided
and this application Nov. 3, 1971, Ser. No. 195,425
Int. Cl. C22b 3/00
U.S. Cl. 75—109                                    1 Claim

ABSTRACT OF THE DISCLOSURE

Equipment and methods for recovering silver from a silver-containing solution. The equipment comprises a container and a connector having an influent liquid passage and an effluent liquid passage. A recovery element made of a metal above silver in the electromotive force series fits within the container to form an electrolytic cell. The metal forming the element is arranged in a woven matrix, such as, for example, galvanized window screen, which is wound around its axis which is common with the axis of the container to form a hollow cylinder having an inside surface and an outside surface and which is pervious only transversely in respect to the container. One of the passages is in liquid communication with the inside surface of the element, and the other passage is in liquid communication with the outside surface of the element. The solution precipitates silver in exchange for the metal of the woven matrix, without clogging of the cell.

BACKGROUND

Continuity

This application is a division of my copending U.S. patent application Ser. No. 17,836, filed Mar. 9, 1970, now U.S. Pat. No. 3,630,505, issued Dec. 28, 1971.

Field of invention

This invention relates generally to silver recovery and more particularly to a silver recovery method which utilizes an improved metallic core which defines transverse passageways and is easily formed, handled and replaced.

Prior art

Various silver salts used in photographic paper and film when fixed by various fixatives produce a complex silver salt which is dissolved or suspended in solution. As the fixatives become depleted, it is necessary that they be replaced to keep the fixing solution at a satisfactory strength if uniform and acceptable results are to be obtained. This replenishment is often accomplished on a continuing basis by the addition of a given volume of concentrated solution of fixatives to the fixing bath, while at the same time an equivalent volume of spent solution is withdrawn.

A method for recovering silver from such spent solutions hase been developed. The method requires the passing of solutions containing silver salts through packed steel wool or small cut pieces of galvanized window screen. The steel wool and pieces of screen are anodic to silver so that a chemical replacement action will occur, which causes precipitation and deposition of the silver as the steel wool or pieces of screen dissolve. The disadvantage of packed steel wool has been its lack of resistance to corrosion caused by the fixing solution. Specifically, the steel wool fibers are small in diameter and, therefore, readily dissolved by the solution. The result is that relatively large openings develop in the steel wool and the fixing solution, thereafter, flows through the openings rather than through the remaining packed steel wool fibers since the openings present less resistance to flow. The steel wool must be replaced once the existence of such openings is discovered in order to restore satisfactory efficiency to the silver recovery unit. Also, it may be necessary to recycle expelled solution a second time through the unit.

Use of screen, as indicated, has been disadvantageous because of the expensive requirement that the screen be cut into small pieces prior to use in the cell.

Further, silver recovery units as proposed by the prior art have comprised restricted solution passages which are frequently clogged by solid particles carried in the fixing solution.

BRIEF SUMMARY AND OBJECTS OF THE INVENTION

The mentioned disadvantages of prior art silver recovery units have been substantially alleviated by the present invention, which comprises a method wherein a container having solution inlet and outlet passages are used. A transversely-pervious metallic core fits axially within the container, the core substantially preventing axial flow of solution therein and confining flow to the transverse displacement of solution between inside and outside surfaces of the core. The core is preferably constructed from axially-oriented, coiled screen with small mesh openings.

The result is that silver recovery according to the present inventive method remain highly efficient until the replaceable metallic core has been fully utilized and the operation is not subject to interruptions due to clogging.

It is a primary object of this invention to provide an improved silver recovery method.

Another important object of the present invention is to provide an improved silver recovery method wherein a metallic core defines transverse flow paths between inside and outside axially-extending surfaces of the metallic core.

These and other objects and features of the present invention will become more fully apparent from the following description and appended claims taken in conjunction with the accompanying drawings.

BRIEF DESCRIPTION OF THE DRAWINGS

FIG. 1 is a perspective view with parts broken away for clarity of illustration of one presently preferred embodiment of this invention;

FIG. 2 is a cross sectional view taken along line 2—2 of FIG. 1;

FIG. 3 is an enlarged fragmentary cross section in elevation of solution influent and effluent structure of the silver recovery unit of FIG. 1;

FIG. 4 is an enlarged fragmentary view of a portion of the coiled screen core of the unit of FIG. 1; and FIG. 5 is a fragmentary elevational view of one layer of the coiled screen core taken along lines 5—5 of FIG. 4.

DETAILED DESCRIPTION OF THE ILLUSTRATED EMBODIMENT

General

As is best shown in FIGS. 1 and 2, a silver recovery unit, generally designated 10, comprises a can or container 12, a liquid connector structure 14 and a metallic core 16, which is located axially within the container 12 and is in liquid communication with solution influent and effluent parts of the liquid connector 14.

The container

The container 12, which is liquid tight, comprises a hollow cylinder with a side wall 18 and a bottom wall 19. The container 12 further comprises a removable top or lid 20 which is secured by threads 22 to the threads 24 of the side wall 18. Alternatively, the lid 20 can be secured to the remainder of the container 12 by a clamp-type lid. The container 12 is completely lined or coated with a material 21, such as polyethylene, which is inert to fixing solution. It is preferred to have the lid 20 removable from the remainder of the container 12 in order to facilitate removal and replacement of the metallic core 16. The lid 20 has a central collar 25, made of suitable inert plastic, which has a threaded bore 26 that accepts in sealed relation a portion of the liquid connector 14.

The liquid connector

The liquid connector 14 has an inlet port 28 and an outlet port 29 for communicating silver-containing fixing solution to and from the container 12. The connector 14 is made of inert plastic, such as polyvinyl chloride, comprising components which are chemically bonded together.

The inlet port 28 comprises part of the hollow interior of a T 30 having one end 31 which is adapted to be connected to a supply of solution (not shown). The left end of the T 30 is joined to a tapered conduit 32. The lower end 33 of conduit 32 has a relatively large inside diameter and is threaded at 35 onto one end of a pipe nipple 34. The pipe nipple 34, in turn, is threaded into the threaded opening 26 of the collar 25. The conduit 32 is also sized so that the opening 39 adjacent the end 33 is large and unrestricted, and does not cause clogging by accumulation of sludge. The upper end 37 of the influent conduit 32 is sealed.

In summary, the inlet port 28 and the passage 39 define an influent flow path for solution from a source (not shown) to one end of the inside of the container 12.

The outflow port 29 comprises part of the hollow interior of a T 38 which has a discharge end 39 through which solution is discharged. A second end 40 of the T 38 is connected by a lap joint to a spacer 41 which, in turn, is joined to the end 42 of conduit 32. Fitting snugly within the hollow interior of the spacer 41, so as to fluidly connect to the T 38, is an effluent conduit 43 having an interior cross sectional area less than the cross sectional area between the outside surface of conduit 43 and the inside surface of the concentric conduit 32 at passage 39 to avoid clogging.

The tube 43 extends downwardly into the container 12 and connects in press-fit relation at 49 to a second intermediate tube 44 of a larger diameter. See FIG. 2. The tube 44 in turn connects by press-fit relation at 51 to a hose 45. Thus, the hollow centers 53 of tubes 43, 44 and 45 together with port 29 define an effluent flow path for the solution.

The top end 55 of the T 38 is joined to the lower end of an overflow T 46. The T 46 also comprises a top vent end 47 and an overflow connection 48. The overflow end 48 is joined to the upwardly-directed end 50 of the T 30 by a hollow hose 52 to define a bypass between effluent and influent structure which is utilized only if overflow conditions develop. Specifically, the T 46 provides relief should the effluent discharge clog downstream of port 29. Also, should excessive pressures develop in the container 12 sufficient to cause overflow, the liquid in the container would first overflow through the bypass leg 48 of T 46 to the influent T 30. Overflow greater than the capacity of leg 48 would escape through the upper end 47 of the T 46.

The metallic core

The core 16 is transversely permeable and is comprised of metal which is above silver in the electromotive force series. Although several such metals are known that will perform satisfactorily, it has been found that iron in the form of a galvanized, woven screen matrix is well suited to this use. The forming of window screen into a suitable metallic core is readily accomplished without substantial investment of labor and, when properly inserted in the container 12 causes a unique flow pattern of solution through the screen. One method of forming the core 16 from screen comprises winding a section of screen about a mandrel having a diameter slightly larger than the outside diameter of the hose 45 until the coiled screen develops an outside diameter somewhat smaller than the inside diameter of the container 12. With the screen thus formed into a hollow cylinder, a fastener 56, shown in FIG. 1, in the form of a loop is secured in position about the coiled screen to retain the generally circular layers thereof in contiguous relation one with respect to the next. Once the mandrel is removed, the coiled screen can be transversely cut into sections slightly shorter in length than the inside axial length of the container 12.

With the lid 20 removed from the remainder of the container 12, the core 16 is placed in an axially extending attitude within the container 12. The axis of the container is essentially common with the axis of the core 16. Consequently, the core 16 defines an axially-extending outside surface 62, spaced a short distance from the liner 21 of the container 12, and an axially-extending inside surface 63 (FIG. 2) spaced a short radial distance from the outside surface of the hose 45. Preferably, the bottom of the core 16 rests against the bottom inside surface 66 of the liner 21 of the container 12. The top of the core 16 supports a seal flap 70 at the lower surface 68 thereof.

The flap 70 has a central opening 72 which frictionally engages the outside surface of the tube 43 to create a liquid seal and to hold the seal flap 70 in position. The peripheral edges 76 of the impervious seal flap 70 are usually juxtaposed the outside diameter of the core 16. The purpose of the seal flap 70 is to displace influent solution entering the container through passage 39 into the space between the inside surface of the liner 21 and the outside surface 62 of the core 16.

A grill 79, shown in FIGS. 1 and 2, rests upon the flap 70 with upwardly projecting posts 71 engaging the inside surface of the liner 21 of the lid 20. The grid 79 calms turbulence and distributes influent solution around the periphery of a core 16.

Fluid entering the chamber between the container 12 and the core 16 is forced by the pressure of the system generally transversely through the mesh openings in the screen which, taken together, define a plurality of transversely or laterally extending flow paths or passageways indicated by arrows 81 in FIG. 4. At the same time, no appreciable axial flow of solution occurs through the screen layers of the core 16. Naturally, the transverse flow indicated by arrows 81 will become of higher velocity as the flow approaches the chamber between the tube 45 and the inside surface of the core 16 because of the radial orientation of the mesh openings, i.e. there are considerably fewer mesh openings at the inside surface 63 than at the outside surface 62 of the core 16.

Also, little if any solution flow occurs at the interfaces between the flap 70 and the core 16 and the liner 21 at the bottom of the container 12 and the core 16. Accordingly, the acceleration of the solution transversely through the screen layers of the core 16 has a self purging effect which tends to prevent clogging of the mesh openings.

As shown in FIG. 5, typically the wires 82, 84, 86, 88 and 90 are continuously wound about the core 16 from the inside surface 63 to the outside surface 62. The wound wires 82, 84, 86, 88 and 90 in combination with the longitudinally-directed wires 100 comprise a woven matrix defining relatively small mesh openings on the order of the mesh openings of window screen, as best illustrated in FIG. 5.

Experimentation has proven the described silver recovery apparatus as extremely efficient, and easily maintained. The core element has been found to remain an effective metal exchange source for silver over a protracted period of time. Clogging has also been reduced in a material way by use of the present system.

While passing through the core 16, the solution, which contains silver salt, exchanges silver ions of the salt for iron ions of the core, thus depositing silver within the container 12. The iron ions remain in the solution as it flows into the cavity between the inside surface 63 of the core 16 and the outside surface of the hose 45.

Treated solution in the cavity between the inside surface 63 of the core 16 and the outside surface of the tube 45 is evacuated through the lower end 65 of the hose 45 and through the previously-described solution effluent structure.

Later, the silver, in the form of sludge, is removed from the container 12 and reduced to elemental silver by conventional processes.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A method of recovering silver from solution, comprising the steps of:
    locating a hollow metallic coil of superimposed essentially circular layers of mesh screen comprised of a metal which is above silver in the electromotive force series within a container having a longitudinal axis such that the layers respectively generally extend in an axial direction;
    introducing the solution into the container;
    displacing the solution generally axially within the container into lateral proximity with one of two axially extending exposed surfaces of the metallic core;
    constraining further movement of said displaced solution to essentially radially directed flow transversely through screen mesh openings along a plurality of flow paths substantially transverse of said axis from one exposed screen surface to the other, exchanging screen ions for silver ions along said flow paths and depositing a silver containing material within the container;
    discharging the radially displaced solution from the container.

References Cited
UNITED STATES PATENTS

| | | | |
|---|---|---|---|
| 2,712,931 | 7/1955 | Maddock | 266—22 |
| 2,905,323 | 9/1959 | Megesi | 75—109 X |
| 3,655,175 | 4/1972 | Zeleny et al. | 75—109 X |
| 3,369,801 | 2/1968 | Hartman | 75—118 X |

HERBERT T. CARTER, Primary Examiner

U.S. Cl. X.R.

75—118; 266—22